United States Patent
Engstrand et al.

[11] Patent Number: 6,101,306
[45] Date of Patent: Aug. 8, 2000

[54] METHOD AND DEVICE FOR FIXING OPTICAL FIBRES

[75] Inventors: Jan-Åke Engstrand, Trångsund; Hans-Christer Moll, Enskede, both of Sweden

[73] Assignee: Telefonaktiebolaget LM Ericsson, Stockholm, Sweden

[21] Appl. No.: 09/200,604

[22] Filed: Nov. 30, 1998

[30] Foreign Application Priority Data

Dec. 1, 1997 [SE] Sweden .................................. 9704467

[51] Int. Cl.7 ...................................................... G02B 6/00
[52] U.S. Cl. ............................................. 385/137; 385/97
[58] Field of Search .................................... 385/137, 134, 385/135, 136, 138, 139, 95–99

[56] References Cited

U.S. PATENT DOCUMENTS

| 4,750,804 | 6/1988 | Osaka et al. ........................ 385/95 X |
| 5,627,930 | 5/1997 | Ishiguro et al. ..................... 385/96 X |
| 5,991,492 | 11/1999 | Ota et al. ............................. 385/137 |

FOREIGN PATENT DOCUMENTS

| 0382511 A2 | 8/1990 | European Pat. Off. . |
| 0645651 A1 | 3/1995 | European Pat. Off. . |

*Primary Examiner*—Phan T. H. Palmer
*Attorney, Agent, or Firm*—Burns, Doane, Swecker & Mathis, L.L.P.

[57] ABSTRACT

The present invention relates to a method and a device for aligning wave guides such as optical fibers on a carrier. In order to fix the wave guide such as optical fibers on a carrier made of e.g., silicon, adhesive and a lid have been used, wherein the optical fibers have been placed in grooves on the carrier and the adhesive supplied to capillaries between the optical fibers in the grooves on the carrier and the attached lid, whereby a fixation of the optical fibers on the carrier has been obtained. In order to improve the adhesive penetration and to minimise the risk for air bubbles being formed between the carrier and the lid the lid has been formed divided comprised of for example two ribs (14,15) arranged in parallel. The ribs when fastened onto the carrier will form two short capillaries between the ribs and the carrier with the optical fibers whereby it becomes easier to introduce the adhesive between the ribs and the optical fibers on the carrier and the adhesive will be able to be ventilated better.

4 Claims, 1 Drawing Sheet

METHOD AND DEVICE FOR FIXING OPTICAL FIBRES

TECHNICAL FIELD

The present invention relates to a method for fixing wave guides such as optical fibres on a carrier during the aligning of wave guides/optical fibres on the carrier and a device for fixing the wave guides such as optical fibres on a carrier during the alignment of the wave guides/optical fibres on the carrier.

STATE OF THE ART

In order to align and fix wave guides such as optical fibres on a carrier made of e.g. silicon, V-grooves in the carrier, adhesive and a cover have been used. In this connection the optical fibres are placed in the V-grooves on the carrier and pushed in between the carrier and the cover fastened on the carrier along the grooves in the carrier whereafter the adhesive is supplied to the capillaries formed between the lid and the carrier with the fibres, whereby the lid on the carrier together with the hardened adhesive have fixed the optical fibres in the groove on the carrier. Difficulties can however occur with introducing the adhesive under the whole of the lid when the capillaries which are formed between the lid and the carrier with the pushed-in optical fibres in the grooves can act as obstacles for the penetration of the adhesive between the lid and the carrier. With a long capillary between the lid and the carrier it can also take time for the adhesive to penetrate in to the space formed there which can lead to air bubbles forming between the lid and the carrier.

From EP-0 645 651 A1 and 0 382 511 A2 it has been shown to have been previously known during fixation of optical fibres in grooves on carriers to use an adhesive and a lid with an opening. Ventilating of the adhesive region and/or overflowing of excess glue during the penetration of the glue between the lid and the carrier can be obtained through the openings.

DISCLOSURE OF THE INVENTION

In order to minimise the risk that air bubbles form between a carrier and a lid during the fixing of optical fibres in grooves of the carrier the lid is arranged divided into two in the form of transverse ribs arranged in parallel which can be fastened to the carrier to form two short elongated capillaries between itself and the carrier. With this construction of the so-called lid it is easier to introduce the adhesive into the capillaries between the lid and the carrier with optical fibres in the grooves and the adhesive can be ventilated more easily. This also results in that the risk for forming air bubbles between the carrier and the lid is minimised. The carrier can itself contain one or more V-grooves which themselves form the aligning element. The lid consisting of the two ribs fastened on the carrier and the supplied adhesive together hold the optical fibres in position in the V-grooves between the lid divided into two and the carrier through a good adhesive penetration being achieved without air bubbles needing to be formed in the adhesive layer between the ribs/the lid divided into two and the carrier with optical fibres in the grooves.

The invention will be described more closely with the help of a preferred embodiment with reference to the appended drawings.

PREFERRED EMBODIMENTS

Figure 1A:
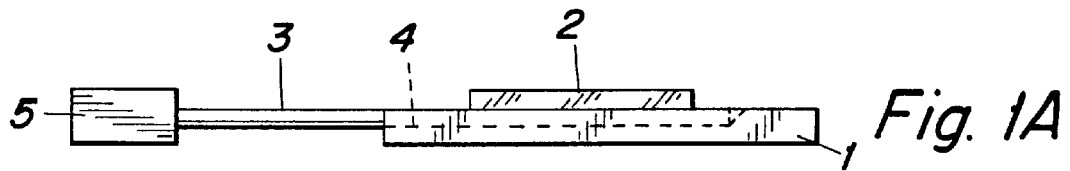
FIG. 1 shows from the side and from above a carrier for optical fibres with a whole glass lid.
Figure 1B:
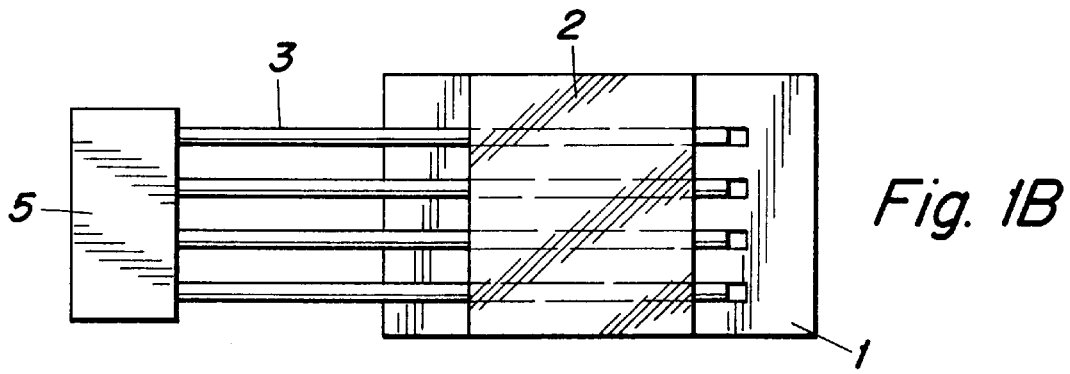

FIG. 1 shows how a carrier 1 made of silicon with a complete attached/bonded glass lid 2 can be arranged for one or more optical fibres or fibre arrays for mounting of receivers and transmitters, where the optical fibres 3 are placed in grooves 4 such as V-grooves in the carrier under the glass lid. A primary protection 5 is arranged around the optical fibres in front of the carrier. In order that the mounting of the optical fibres shall function adhesive has been introduced after the insertion of the optical fibres in the grooves between the lid and the carrier. Depending partly on the length/width relationship between the lid and the carrier the capillary which is formed between the lid and the carrier can influence the inflow of adhesive and thereby the spreading of the adhesive between the lid and the carrier and can also contribute to the formation of air bubbles in the region under the lid.

Figure 2A:
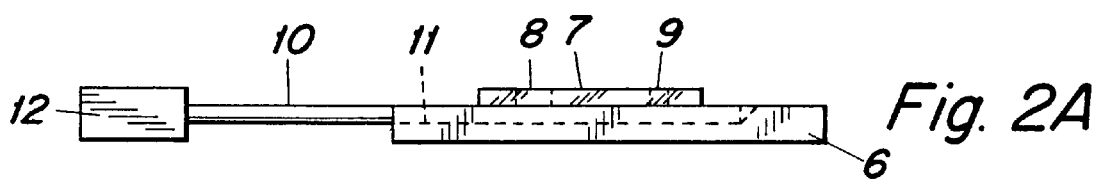
FIG. 2 shows from the side and from above a carrier for optical fibres with a whole glass lid and ventilating holes in the lid.
Figure 2B:
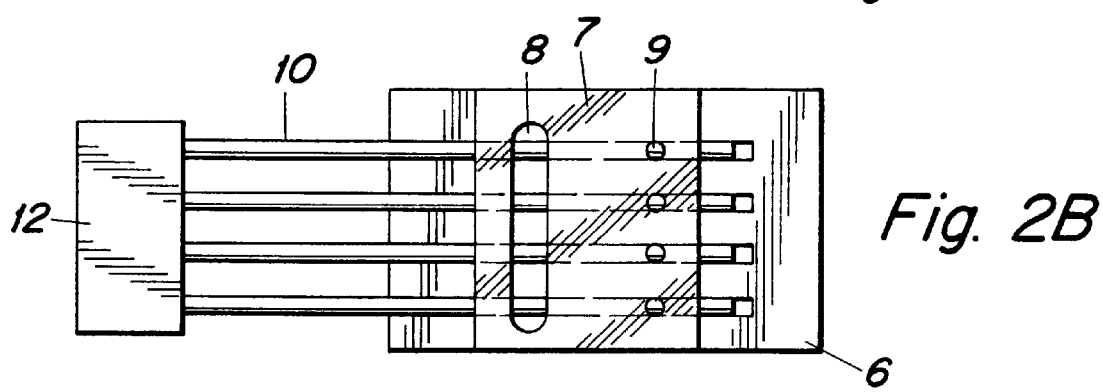

FIG. 2 shows how a carrier 6 with a complete attached glass lid 7 with holes 8 and 9 can be designed. The optical fibres 10 are also here introduced into the grooves 11 such as V-grooves in the carrier under the glass lid. In this case the primary protection 12 can also be arranged around the optical fibres in front of the carrier. In order to fix the optical fibres between the carrier and the lid adhesive has been introduced through a hole 8 which is elongated in a transverse direction in relationship to the optical fibres, in one end of the lid. The adhesive could also be introduced in some other way, but with the ventilating hole 9 in the other end of the lid air which opposes the spreading of the adhesive in the capillaries can be pressed out or excess adhesive pressed out whereby bubble formation in the glue layer can also be prevented.

Figure 3A:
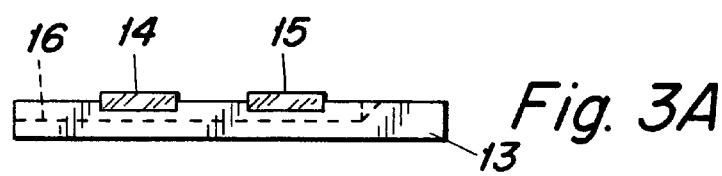
FIG. 3 shows from the side and from above a carrier for optical fibres with a divided glass lid in the shape of two ribs arranged in parallel according to the invention.
Figure 3B:
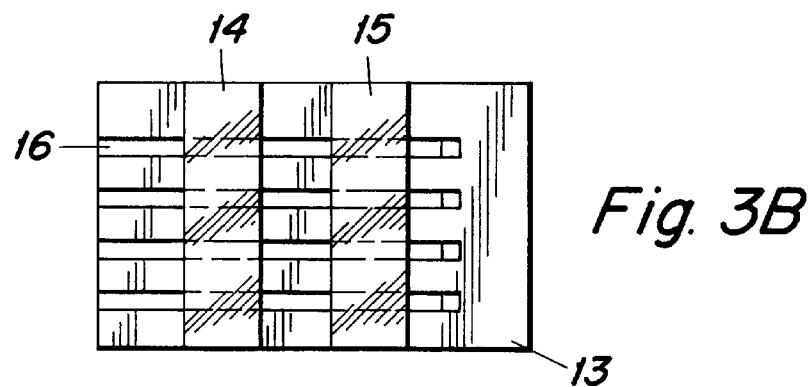

FIG. 3 shows how a carrier 13 with a divided into two glass lid fastened/bonded onto the carrier, comprised of two ribs 14 and 15 can be designed according to the invention. The divided into two glass lid can be made through a whole glass lid fastened onto a carrier being sawn in two or provided with a groove so that two rib shapes on the carrier remain after the treatment. Each rib here is long and narrow and transverse with respect to the direction of the optical fibres in the carrier. Between each attached rib and the inserted optical fibres in the grooves 16 on the carrier 13 the adhesive penetration is facilitated and a better fixation of the optical fibres in the grooves on the carrier is achieved through the capillaries being shorter than the capillaries formed in FIG. 1. With shorter capillaries the mechanical tension on the lid and carrier also are reduced. Also the risk for formation of air bubbles is reduced which also leads to a probable better fixing of the optical fibres in the carrier. The adhesive is supplied between the lid and the optical fibres in the grooves after the insertion of the optical fibres between only one rib of a number of ribs and the carrier or after the insertion of the optical fibres between each rib and the carrier.

Alternatively the attached divided glass lid can be comprised of more than two ribs for example three or more in order to when necessary be able to adapt the fixation of optical fibres to special fields of use.

The invention is naturally not limited to the above described embodiments shown in the drawings but can be modified within the scope of the accompanying claims.

What is claimed is:

1. Device for fixing optical fibers on a carrier with V-grooves during the alignment of optical fibers on the carrier, comprising a carrier with V-grooves, a lid attached to the carrier, and a glue layer, wherein the lid is divided into two ribs, wherein two capillaries are formed between the lid attached to the carrier and the optical fibers and wherein the lid facilitates the penetration of adhesive between the lid and the carrier with optical fibers, whereby the risk for formation of air bubbles between the carrier and the lid during the gluing of the optical fibres onto the carrier is reduced.

2. Device for fixing optical fibers on a carrier with grooves during the alignment of optical fibers on the carrier, comprising:

a lid for securing optical fibers to the carrier, wherein said lid further comprises:

at least two separate ribs which are fastened to the carrier so that when securing optical fibers to the carrier the ribs are transverse to the grooves.

3. Method for fixing optical fibers on a carrier having grooves, during alignment of optical fibers on the carrier, wherein the carrier comprises a lid and an adhesive wherein said lid has a plurality of ribs, comprising the steps of:

securing optical fibers into the grooves of the carrier by placing said lid onto said carrier;

forming capillaries between the separate ribs of the lid and the carrier; and fixing said optical fibers to the carrier.

4. The method of claim 3, wherein said fixing of the optical fibers to the carrier comprises placing adhesive under each separate rib of the lid.

* * * * *